Jan. 26, 1954  E. P. G. WRIGHT ET AL  2,667,538
AUTOMATIC TELEPHONE TICKETING SYSTEM
Filed March 3, 1950  5 Sheets-Sheet 1
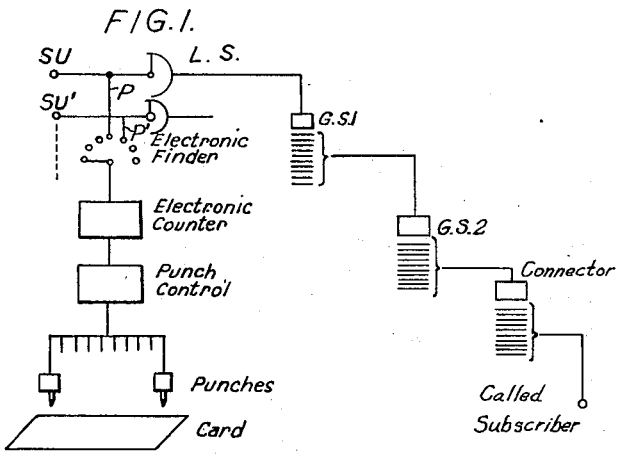
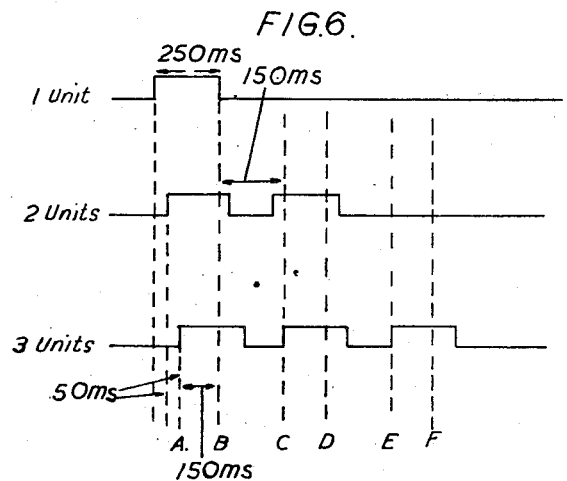
Inventors
ESMOND P. G. WRIGHT
JOSEPH RICE
By
Attorney

Jan. 26, 1954

E. P. G. WRIGHT ET AL
2,667,538

AUTOMATIC TELEPHONE TICKETING SYSTEM

Filed March 3, 1950

*Inventors*
ESMOND P. G. WRIGHT
JOSEPH RICE

By *Robert Harding Jr.*
*Attorney*

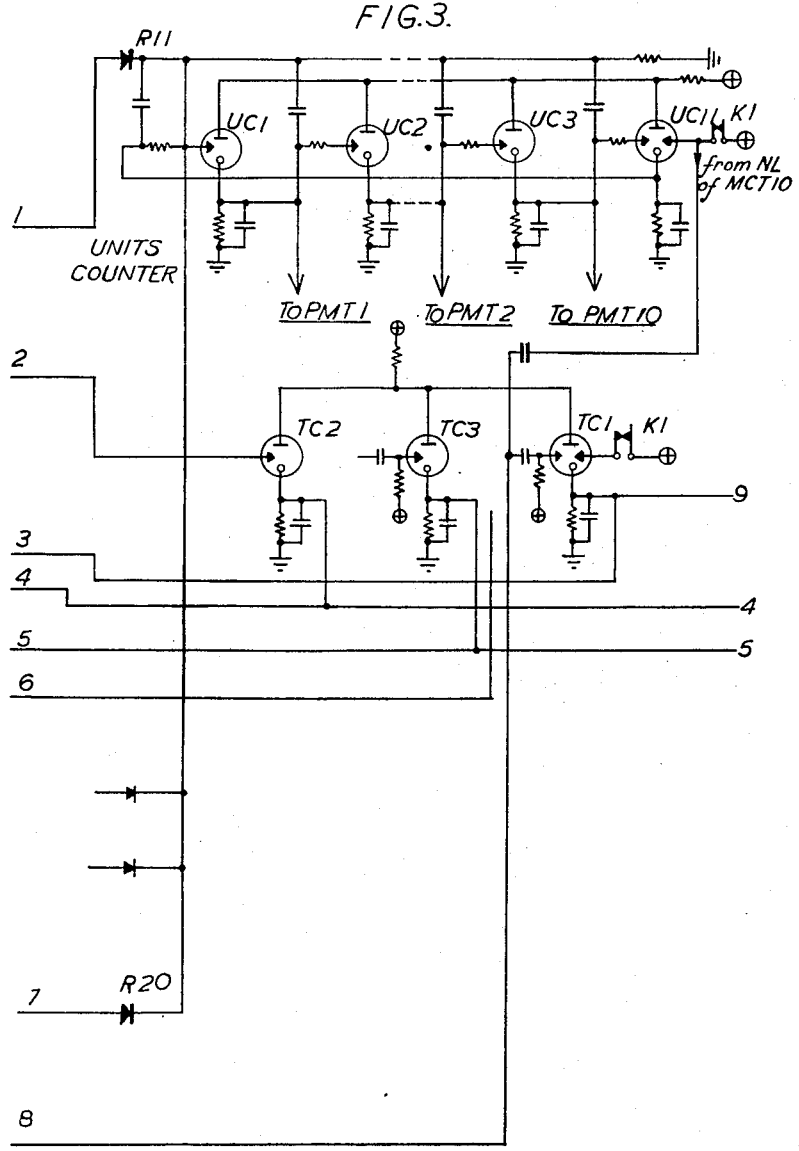

Jan. 26, 1954 E. P. G. WRIGHT ET AL 2,667,538
AUTOMATIC TELEPHONE TICKETING SYSTEM
Filed March 3, 1950 5 Sheets-Sheet 4
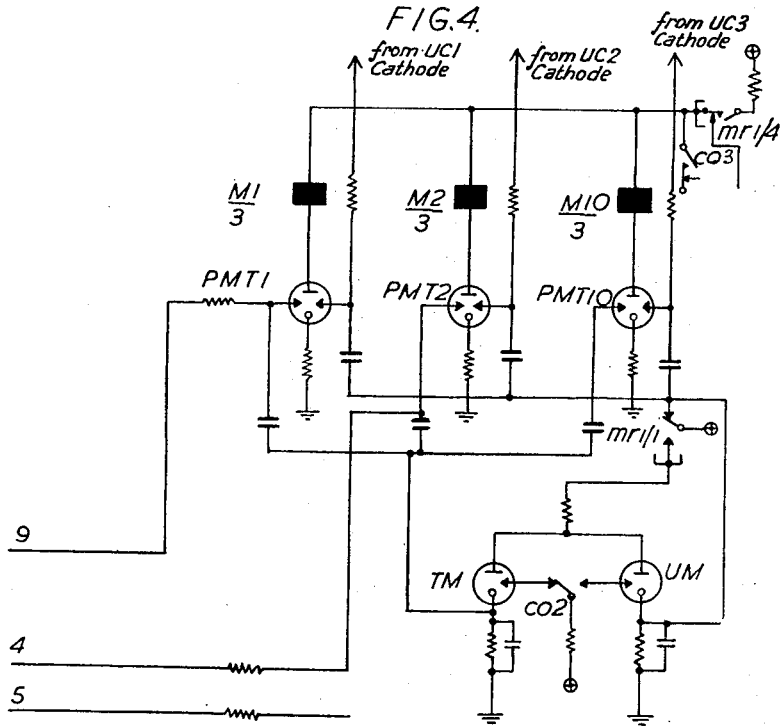
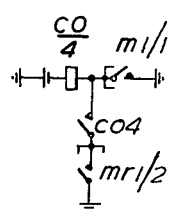
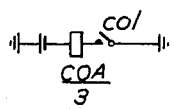
Inventors
ESMOND P. G. WRIGHT
JOSEPH RICE
By
Attorney Jan. 26, 1954  E. P. G. WRIGHT ET AL  2,667,538
AUTOMATIC TELEPHONE TICKETING SYSTEM
Filed March 3, 1950  5 Sheets-Sheet 5
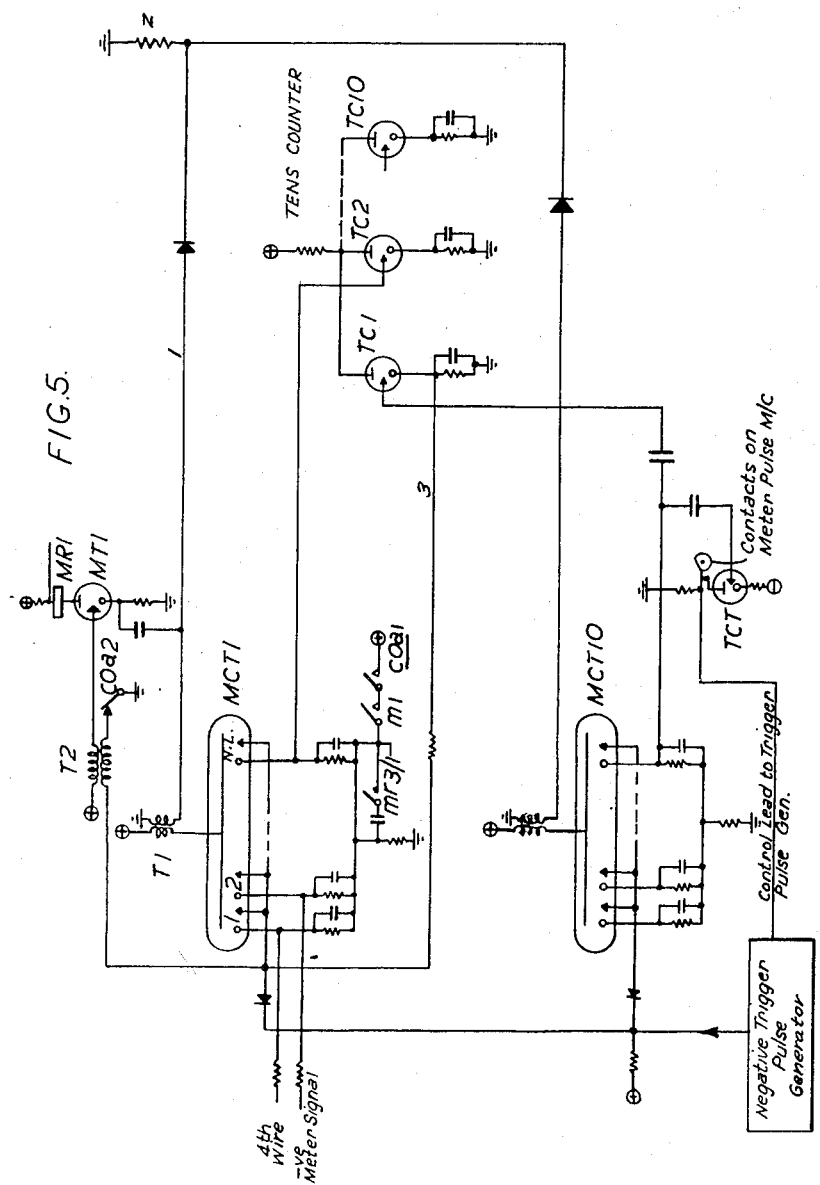
Inventors
ESMOND P. G. WRIGHT
JOSEPH RICE
By Robert Harding Jr.
Attorney

Patented Jan. 26, 1954

2,667,538

UNITED STATES PATENT OFFICE 2,667,538

AUTOMATIC TELEPHONE TICKETING SYSTEM

Esmond Philip Goodwin Wright and Joseph Rice, London, England, assignors to International Standard Electric Corporation, New York, N. Y., a corporation of Delaware Application March 3, 1950, Serial No. 147,352

Claims priority, application Great Britain March 15, 1949

7 Claims. (Cl. 179—7)

The invention relates to automatic telecommunication exchange systems.

The object of the present invention is to provide an economical and simple system for testing the conditions of the lines in a group of circuits.

The main feature of the present invention as applied in an automatic telecommunication exchange comprises means for automatically scanning a group of circuits, means for testing the condition of the circuits during a scanning, and means for recording the identity of a circuit in a particular condition.

A further feature of the invention comprises the use in such an exchange of scanning means comprising a group of static electric switches.

A static electric switch is a static electrical device, the conductivity of a path through which is capable of a particular change from one quasi-stationary value to another separate quasi-stationary value at, and only at, a certain voltage condition applied to said device.

The invention will now be described with reference to the accompanying drawings, showing as an example, a subscribers' metering system, in which Fig. 1 is an operational schematic of one embodiment of the invention, Figs. 2, 3, and 4 show in detail an embodiment of the invention. Fig. 3 should be placed to the right of Fig. 2, and Fig. 4 placed at the right of Fig. 3.

Fig. 5 shows a modified form of the circuit of Figs. 2, 3 and 4 adapted for 4th wire metering.

Fig. 6 shows metering pulses to be described later.

Referring first to Fig. 1, a subscriber SU is connected to a line selector LS and through LS to a group selector GS in a normal manner. The subscriber SU is also connected over lead P to an electronic finder, electronic counter and punch control. The punch control operates the punches 1–0 to mark the designation desired on the card.

Figs. 2, 3 and 4 together show an embodiment of the invention adapted to use in a booster battery system in which metering pulses are received on the third or private wire of the calling subscriber's line circuit. As is well known, in a booster battery metering circuit, the meter is so designed that it does not operate on the normal exchange voltage. When, however, the voltage is increased to a higher value by the connection of the booster or auxiliary battery in series with the normal exchange voltage, the meter operates. Recording of calls completed is on punch cards, so that storing and accounting may be carried out by known means.

The calling rate of an exchange would govern the number of punch card machines required but in general, to allocate one punch card machine per group of a hundred subscribers is sufficient.

SI1, SI2 . . . S100 are cold cathode gaseous discharge tubes each associated with the private wire of an individual subscriber in the group; MCT1 to MCT10 are 11 point unidirectional multi-cathode tubes of the type described and illustrated in the U. S. Patent No. 2,553,585, issued to G. Hough, one tube being allocated to each tens group of subscribers, TC1 to TC10 and UC1 to UC11 are counting banks for counting tens and units respectively; PMT1 to PMT10 are tubes used to operate the punch magnets M1 to M10 for recording the number of the calling subscriber. It will be apparent that although the counting banks in the present embodiment count in tens and units it is possible for them to count in any orders (e. g. tens and twelves, or twenties and twenties) required. It is also apparent that more than two orders of counting may be provided if necessary.

The operation of the circuit in the absence of metering pulses will now be considered. Initially tubes TC1 and UC11 which are four-electrode tubes (whereas the other tubes in the counting trains are three-electrode tubes), are struck by the application of a positive potential to the auxiliary trigger electrodes by means of a key K1. K1 is closed when the equipment is prepared for use and may comprise a manually operated key or some contacts of a relay which operates when the power supply is initially switched on, thus ensuring continuous scanning of the subscribers' private wires. The eleventh cathodes NL of each of the multi-cathode tubes MCT1–10 are also passing current because the discharge gap of NL is made smaller than the other gaps in the tube and is adapted to strike as the normal potential it applied across the tube. This potential is not enough, however, to strike the other gaps at the tube, even when NL is passing current. Negative pulses from a source of negative trigger pulses are applied over the common trigger input lead TL to the trigger electrodes of the multi-cathode tubes. Under normal conditions with successive negative pulses applied to the trigger electrodes, the glow in tubes MCT1–10 would step from one cathode to the next, making one step for each applied negative trigger pulse. However, the rectifiers R1 to R10 are connected between the trigger lead and the cathodes of tubes TC1 to TC10 respectively, in such a manner as to normally prevent the negative pulses from reaching the cathodes only R1 presents a low impedance initially, since the cathode voltage of TC1 is positive due to the current flow through this tube. The trigger voltage is therefore applied to the cathodes of tube MCT1 across the primary of transformer T2 and the glow steps in this tube only. Negative pulses will be produced in the primary winding of the pulse transformer T1 which correspond in phase to the triggering pulses which successively fire the gaps of MCT1. The secondary winding of T1 is so connected that positive impulses are fed to the units of the counting bank UC1 to UC11. These tubes strike in sequence, each extinguishing the previous tube in the manner described for example in U. S. Patent No. 2,421,005, issued on May 27, 1947, to Bray et al. The particular tube struck in this bank will indicate the position of the glow in MCT1. Rectifiers R11 to R20 prevent pulses from T1 from being fed to the anodes of the other tubes. When the glow in tube MCT1 reaches the eleventh gap NL the voltage of the cathode thereof rises and a positive pulse appears on the trigger electrode of tube TC2, striking this tube and extinguishing tube TC1 through the sudden drop across the common load resistor in a well known manner and as described in the above-mentioned patent. The effect of this is to make rectifier R2 appear as a low impedance due to the positive potential on the cathode of TC2, and R1 as a high impedance since the positive potential on the cathode of TC1 is removed. The result of this is that negative trigger pulses are "switched" from tube MCT1 to MCT2. The action described above is repeated, the units counter again counting in sequence with the stepping of the glow. It is evident that the position of the glow in the multicathode tubes is indicated by the combination of tubes struck in the counting trains TC1 to TC10 and UC1 to UC10. For instance, if the glow is on the third cathode of MCT7, indicating subscriber 73, this will be indicated by tubes TC7 and UC3 being struck.

To ensure that the units bank is in step with the glow stepping, when the counting reaches the eleventh cathode of MCT10 a positive pulse is fed over lead 8 from NL of MCT10 to the auxiliary trigger of UC11 so that if this tube is not struck, as would be the case if the two counts were in step, the counting is re-synchronized.

While counting is in progress, negative pulses are also fed to the primary of transformer T2 via rectifier R1 from the source of negative trigger pulses. Transformer T2 is used as a pulse inverter, so that positive pulses are applied to the trigger electrode of MT1, associated with MCT1. Each of the tubes MCT1 ... MCT10 has its own transformer T2 connected in a similar manner to the one shown connected to tube MCT1 and relay MT1. Owing to the biassing of the rectifiers R1–R10 from the TC tubes via leads 3 ... 6, negative pulses would pass to the particular transformer indicated by the position of the TC tubes. Thus, only one of the tubes MCT1 ... MCT10 would be supplied with pulses when its related MT tube was stepping. At the same time, positive pulses are supplied from transformer T1 and since these are in phase with the pulses on the trigger, MT1 will not strike, although should the cathode pulses be cut off, the trigger pulses will strike MT1.

In Fig. 1 the private or release wires P, P' etc. are connected to the electronic finder, diagrammatically illustrated as understood by those skilled in the telephone art. It will be understood, however, that each of the private wires is connected to a particular one of the tubes S11, S12 etc. When a connection has been established between a calling and a desired called subscriber, a positive pulse is applied to the private wire of the calling subscriber to the metering arrangement for recording the identity of the subscriber to whom the cost of the call is to be charged in the usual manner.

The action when a metering pulse appears on one of the subscriber's line circuits will now be considered. The corresponding tube, say S12, strikes when the positive pulse appears on its trigger electrode. The anode voltage of this tube falls from earth to some negative voltage and so causes the corresponding cathode of tube MCT1 to become negative. When the glow reaches this cathode during the counting action, this negative voltage prevents the glow from stepping in spite of the presence of the triggering pulses. The tube MCT1 thus acts as a distributor and sequentially scans the condition of the S tubes which are associated with the respective P wires of the subscriber's line. The scanning halts when a cathode is reached which is connected to a triggered S tube. The output from T1 ceases and the units counting train stops with the tube corresponding to the cathode on which the glow is held, i. e. in this case UC2 struck. Complete marking is by TC1 and UC2, which indicates that metering is to take place on subscriber 2 in the first 10 group. Absence of positive pulses from T1 strikes MT1, operating relay MR1. MR1 operating applies H. T. to the anodes of tubes PMT1 to 10 over contact $mr1/4$ and to TM and UM anodes over $mr1/5$. TM strikes due to the positive potential on its trigger electrode and a positive pulse from its cathode is applied to the trigger electrodes of tubes PMT1 and PMT10. One of these tubes will have its trigger electrode at some positive potential from one of the tubes of the tens counting train, which though not enough to strike the tube alone will do so with the assistance of the positive voltage from TM cathode. In the case being considered, TC1, is struck, supplying a positive voltage to the trigger electrode of PMT1, so that the tube will strike and via its anode circuit operate punch magnet M1 which records the tens digit on the punch card. Operation of M1 operates relay CO over contact $mr1/1$, which locks itself via $co4$ and $mr1/6$. A voltage below the sustaining voltage of tubes PMT–PMT10 is applied to the anodes of those tubes over contact $co3$ for the bunching time of the make-before-break contacts $co3$ extinguishing PMT1. Tube UM is struck by changeover of contact $co2$, and the positive pulse from the cathode of tube UM in association with the positive voltage from UC2 cathode causes PMT2 to strike and punch magnet M2 to operate. The appropriate units digit is thereby recorded.

The operation of relay CO operated relay COA over contact $co1$. Thus when the units digit is registered by operation of M2, a circuit is completed to the anode of S. 12 via $coa3$, $mr1/3$, $mr1/2$ from a source of negative potential. This extinguishes tube S12 since the potential thereby applied to its anode is below its sustaining voltage. Tube MT1 is extinguished by its anode being connected to earth over contacts $coa1$ and mrl/2, and relay MRI is thereby released. Release of MRI removes the negative potential from the anode of S12 at mrl/2 open and the associated cathode of MCTI, so that stepping along the cathodes of MCTI recommences. Release of MRI also releases magnet M2 at mrl/4 open and relays CO and COA at mrl/6 open. Contact mrl/4 open removes the H. T. voltage from PMTI to PMTI0 and contact mrl/5 open extinguishes tubes TM and UM. The circuit is now ready for the next metering operation.

Contact coa2 is included in the primary of transformer T2 to ensure that relay MRI cannot reoperate until all the other relays have released. If this precaution was not taken, it would be possible for the operation of MRI to occur before release of the COA relay, thereby causing a false recording. However, stepping can take place, since if another metering marker is encountered, the position will hold until relay COA has released when recording occurs for the new number.

The circuit adapted for metering when metering pulses are received on a fourth wire, as is sometimes the case with linefinder-type systems will be described with reference to Fig. 5. It will be understood that in a 4th wire metering system a separate metallic path is provided for each subscriber and separate level on the line finder is used. When the called party answers a relay responds to reverse battery and applies a potential which is adapted to actuate a meter of classical design. A more detailed description of a known "fourth wire" metering arrangement may be found on page 13 of the May 1939 issue of "The Strowger Journal." Since a positive signal is no longer essential, it is possible to dispense with the tubes S11 to S100, the metering leads or fourth wires of each subscriber in the group being directly connected to the appropriate cathodes of the tubes MCTI to MCTI0. The "fan" of contacts associated with the tubes S11-S100 in Fig. 2 which permitted stepping after metering are therefore also omitted. Removal of holding potential on the cathodes of MCTI is by applying thereto a positive potential over contacts m1 and coa1.

In a fourth wire system it is customary for metering pulses to be supplied in a definite phase, from a meter impulse machine. This also applies to an automatic telephone system which has a multiplicity of unit fees, as in register exchanges. Metering impulses produced by a meter impulse machine for such systems are shown in Fig. 6. It will be readily apparent that when the system is applied to unit-fee systems it is only necessary to search for a calling subscriber during the intervals A—B, C—D and E—F.

Negative trigger pulses are therefore supplied to the metering equipment only during the periods specified. Returning to Fig. 5, the control of these pulses is given by the tube TCT. The multi-cathode tube MCTI ... MCTI0' are arranged somewhat similarly to the arrangement shown in Fig. 2 with the exception that each cathode is connected directly to a different fourth wire of a subscriber's group. In addition, the ultimate gap of MCTI0' is coupled to the control electrode of tube TCT. This tube strikes when the stepping cycle reaches the eleventh cathode NL of MCTI0 and the anode voltage is used to control the output of the negative trigger pulse producing unit. When the next metering cycle is to commence, the anode circuit of TCT is opened by a cam which may be part of the meter pulse machine, so admitting negative triggering pulses to the apparatus. The units counter in Fig. 5 is designated by a load resistance marked Z and corresponds to the tubes UCL ... UCH of Fig. 3. The salient difference between the embodiments of Figs. 2, 3 and 4 on the one hand, and that of Fig. 5 lies in the fact that the tubes S11 ... S100 are not necessary in the Fig. 5 embodiment, since negative pulses are obtained from the automatic switches in the register and thus no transformation from positive pulses, as in the case of the booster battery system, is required.

While the principles of the invention have been described above in connection with specific examples and particular modifications thereto, it is to be clearly understood that this description is made only by way of example and not as a limitation on the scope of the invention.

What is claimed is:

1. Automatic telecommunication exchange recording equipment comprising a group of circuits each having two possible electrical conditions, responding means connected to each of said circuits responsive to a particular one of said two possible electrical conditions, electronic distributor means for automatically scanning said responding means, said distributor means including a source of regularly recurring pulses whereby scanning of said responding means is continuous and at a rate equal to the frequency of the pulses from said source, detector means coupled to said distributor means for detecting when said distributor means has scanned a responsive responding means, counting means under control of and operable in synchronism with said distributor means for counting each responding means scanned and recording means for recording the position of said counting means when said distributor means has scanned a responsive responding means, said recording means operable under the joint control of said detector means and said counting means.

2. Automatic telecommunication exchange as claimed in claim 1 wherein said distributor comprises a group of static electrical switches.

3. Automatic telecommunication exchange system as claimed in claim 1 and in which said recording means comprises a plurality of static electrical switches.

4. Automatic telecommunication exchange recording equipment as claimed in claim 1, wherein said counting means comprises a plurality of banks of static electrical switches each switch having an output, each bank being for a different numerical order, a pair of additional static switches one of said switches having an output coupled to the respective outputs of the switches of a first of said banks, and the other of said switches having an output coupled to the respective outputs of the switches of another of said banks, said pair of switches under joint control of said recording means and said detector means, and adapted to sequentially control the recording of digital values in a plurality of denominational orders which values represent the identities of said responsive responding means.

5. Automatic telecommunication exchange recording equipment as claimed in claim 1, in which said groups of circuits are groups of subscribers' lines, said responding means comprise a plurality of separate static switches, each coupled to a different one of said lines, and said recording means comprises electro-magnetically operable punching equipment adapted to record the identity of a subscriber's line, such line being associated with one of said static switches which has responded and has been scanned by said distributor means.

6. Automatic telecommunication exchange recording equipment as claimed in claim 1 wherein said distributor means comprises a plurality of cold cathode glow discharge gaps, each comprising a plurality of electrodes, each of said gaps corresponding to one of said responding means, and means coupled to said distributor for successively causing an electrical discharge across said gaps.

7. Automatic telecommunication exchange recording equipment as claimed in claim 6, further comprising stopping means coupled to said gaps to stop the scanning of said distributor means when said distributor means has scanned a responsive responding means and distributor scanning re-start means under control of said recording means, said re-start means adapted to re-start scanning of said distributor after operation of said recording means.

ESMOND PHILIP GOODWIN WRIGHT.
JOSEPH RICE.

References Cited in the file of this patent

UNITED STATES PATENTS

| Number | Name | Date |
|---|---|---|
| 1,676,742 | Ostline | July 10, 1928 |
| 1,681,510 | Williams | Aug. 21, 1928 |
| 2,116,808 | Germanton | May 3, 1938 |
| 2,378,541 | Dimond | June 19, 1945 |
| 2,393,403 | Ostline | Jan. 22, 1946 |